Figure 1:
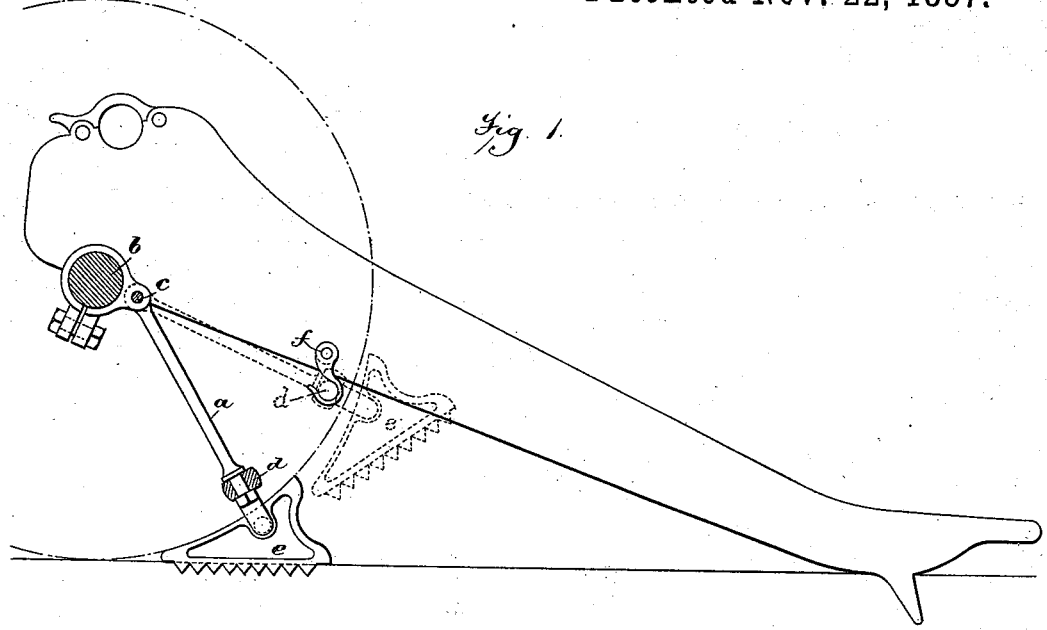

(No Model.)

A. C. KOERNER.
RECOIL BRAKE FOR GUN CARRIAGES.

No. 373,667. Patented Nov. 22, 1887.

UNITED STATES PATENT OFFICE.

ALFRED CHRISTOPHER KOERNER, OF PARIS, FRANCE, ASSIGNOR, BY MESNE ASSIGNMENTS, TO THE HOTCHKISS ORDNANCE COMPANY, (LIMITED,) OF LONDON, ENGLAND.

RECOIL-BRAKE FOR GUN-CARRIAGES.

SPECIFICATION forming part of Letters Patent No. 373,667, dated November 22, 1887.

Application filed April 15, 1886. Serial No. 198,928. (No model.)

*To all whom it may concern:*

Be it known that I, ALFRED CHRISTOPHER KOERNER, engineer, of 21 Rue Royale, Paris, France, have invented certain new and useful Improvements in Recoil-Brakes for Gun-Carriages; and I do declare that the following is a full, clear, and exact description of the same.

This invention relates to brakes that are adapted particularly for use in connection with the wheels of a gun-carriage; and its object is to provide a brake that will effectively resist or check the recoil of such carriage.

The improvement hereinafter particularly described consists, generally, in a brake so arranged with relation to the wheel it is to operate upon that it will, simultaneously with the recoil movement, become wedged or clamped to the wheel so as to check said movement; and it furthermore consists in a brake operating as described that will also and at the same time with said clamping operation be forced into the ground, so as to act as a drag, and thus provide a further means of resistance to said recoil motion.

In the drawings a practical embodiment of the improvement is illustrated, in which—

Figure 2:
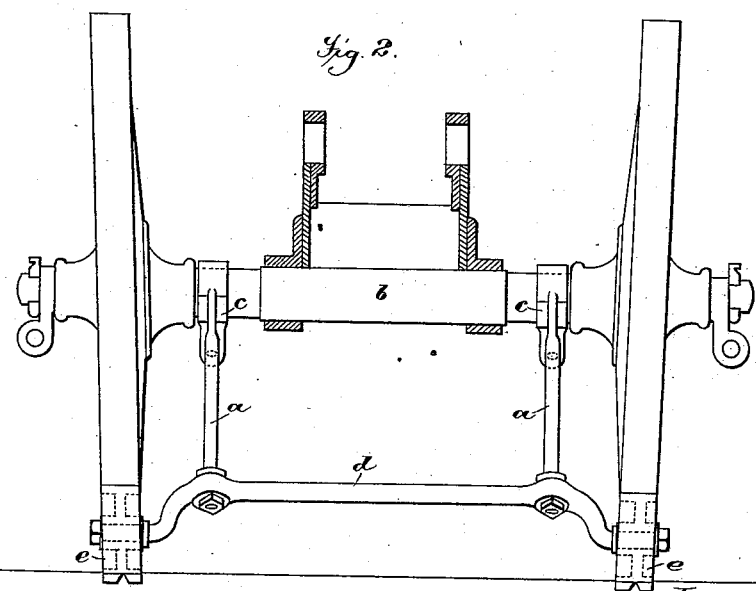

Figure 1 is a sectional side elevation of a gun-carriage, the circumference of the wheel being shown in dotted lines and the brake illustrated by full lines in its operative position; and Fig. 2 is a rear sectional elevation of the carriage, its wheels, and the brake.

The gun-carriage, as usual, consists of a pair of wheels secured upon the axle $b$, upon which is mounted the ordinary stock having bearings for the trunnions of a gun, and provided at its rear end with a trail plate and drag, as is clearly shown.

The brake consists of a pair of shoes, $e$, loosely mounted upon the ends of a cross-bar, $d$, that in turn is carried upon the ends of a pair of rearwardly-extending arms, $a\ a$, that are each pivotally connected by pins $c$ to clips firmly secured around the axle $b$. The pivots of the arms $a$ are thus arranged eccentrically to the axle $b$, and will be so positioned with respect to the tread of the wheels that as the brake-shoes $e$ are dropped into operative position they will be caused to fit snugly and bind upon the tread of the wheels at their rear lower portions, and hence any rearward movement of the wheels in the recoil motion will cause the arms $a$ to exert a downward pull upon the brake-shoes, causing them to still more firmly bind on their treads, thereby checking said motion to a great extent. These brake-shoes are preferably of the wedge shape shown, so that they may be brought more directly under the wheels and in close contact with the ground. The under face of the shoes is corrugated, as shown, or provided with any other suitable anchoring-blades which will become embedded in the ground upon the least rearward movement of the wheels, and thus cause the brake-shoes upon such movement to be still more firmly bound upon their treads, and by means of their corrugated under face to offer the maximum amount of resistance both to the tendency of the wheels to revolve and to drag over the ground.

It will be observed from the foregoing that after any recoil motion of the wheels and carriage has taken place a slight forward movement thereof will cause the brake-shoes to release their hold upon their treads by reason of the eccentric arrangement of the pivots of their arms $a$, so that the brake-shoes will swing away from the under side of the wheels and from the ground, and thus enable them to be withdrawn from their operative position and be swung up and suspended by a hook, $f$, or other securing means, to the under side of the stock of the carriage, and when so suspended be out of contact with the tread of the wheels, as is clearly shown by the dotted lines in Fig. 1.

What I claim is—

1. The combination, with the axle and wheels of a gun-carriage, of the rearwardly-extending arms $a$, pivoted eccentrically to the axle and provided at their ends with the cross-bar $d$, and the wedge shaped brake-shoes $e$, carried by said cross-bar and arranged in position to be drawn against the treads of the wheels as they are swung downward and to wedge in between the wheels and the ground, said brake-shoes being provided upon their under sides with transverse corrugations to engage with the ground to prevent recoil, substantially as described.

2. The combination, with an axle provided with clips secured thereto, of the arms $a$, pivotally connected to said clips, and a cross-bar, $d$, secured to said arms and provided at its opposite ends with brake-shoes $e$, substantially as described.

In witness whereof I have hereunto signed my name in the presence of two subscribing witnesses.

ALFRED CHRISTOPHER KOERNER.

Witnesses:
   M. LEFRANCOIS,
   M. GRALL.